(12) United States Patent
Gabriel et al.

(10) Patent No.: US 8,151,733 B2
(45) Date of Patent: Apr. 10, 2012

(54) FILTER TOP ASSEMBLY

(75) Inventors: George S. Gabriel, Seaford, MD (US);
Neil E. Campbell, Eden, MD (US);
Chinsoo Park, Salisbury, MD (US);
Curtis Miller, Seaford, DE (US); Lynn Irwin, Seaford, DE (US); Rodney Gerringer, Forest Hill, MD (US); Dale Murray, Elkton, MD (US); Arleen Murray, legal representative, Elkton, MD (US)

(73) Assignee: Lab Products, Inc., Seaford, DE (US)

( * ) Notice: Subject to any disclaimer, the term of this patent is extended or adjusted under 35 U.S.C. 154(b) by 0 days.

(21) Appl. No.: 12/583,517

(22) Filed: Aug. 21, 2009

(65) Prior Publication Data

US 2010/0132623 A1    Jun. 3, 2010

Related U.S. Application Data

(60) Provisional application No. 61/090,783, filed on Aug. 21, 2008.

(51) Int. Cl.
*A01K 1/03* (2006.01)

(52) U.S. Cl. .......................... 119/419; 119/454; 119/475

(58) Field of Classification Search .................. 119/417, 119/453, 455, 419, 454, 475
See application file for complete search history.

(56) References Cited

U.S. PATENT DOCUMENTS

| | | | | |
|---|---|---|---|---|
| 3,212,474 A * | 10/1965 | Higgins et al. | ............... | 119/475 |
| 3,334,614 A * | 8/1967 | Gass et al. | ............... | 119/475 |
| 4,480,587 A * | 11/1984 | Sedlacek | ............... | 119/419 |
| 4,907,536 A * | 3/1990 | Chrisler | ............... | 119/419 |
| 5,924,384 A * | 7/1999 | Deitrich et al. | ............... | 119/419 |
| 6,041,741 A * | 3/2000 | Gabriel et al. | ............... | 119/417 |
| 6,227,146 B1 | 5/2001 | Gabriel et al. | | |
| 6,336,425 B1 * | 1/2002 | Gabriel et al. | ............... | 119/419 |
| 6,336,427 B1 * | 1/2002 | Gabriel et al. | ............... | 119/475 |
| 6,341,581 B1 * | 1/2002 | Gabriel et al. | ............... | 119/419 |
| 6,526,915 B1 * | 3/2003 | Gabriel et al. | ............... | 119/72.5 |
| 6,543,387 B1 * | 4/2003 | Stein | ............... | 119/419 |
| 6,584,936 B2 * | 7/2003 | Rivard | ............... | 119/419 |
| 7,595,032 B2 * | 9/2009 | Banks | ............... | 422/292 |
| 7,661,392 B2 * | 2/2010 | Conger et al. | ............... | 119/417 |
| 2002/0069834 A1 * | 6/2002 | Deitrich et al. | ............... | 119/419 |
| 2005/0205017 A1 * | 9/2005 | Irwin et al. | ............... | 119/455 |
| 2007/0068461 A1 * | 3/2007 | Hill | ............... | 119/166 |

FOREIGN PATENT DOCUMENTS

EP    1461997    9/2004

OTHER PUBLICATIONS

International Search Report and Written Opinion of the International Searching Authority (US) dated Jan. 22, 2010, for International Application No. PCT/US2009/004780.

* cited by examiner

*Primary Examiner* — Yvonne Abbott

(74) *Attorney, Agent, or Firm* — Stroock & Stroock & Lavan LLP

(57) ABSTRACT

A filter top assembly for a cage, wherein the assembly includes a bonnet having a perforated top wall to protect filter paper placed above the top wall. The perforations may be small enough to prevent an animal from getting a purchase position and spaced apart sufficiently to prevent the animal from biting the spacing between the perforations. The bonnet may also include one or more elevated ribs to retain the filter paper suspended above the bonnet.

11 Claims, 8 Drawing Sheets

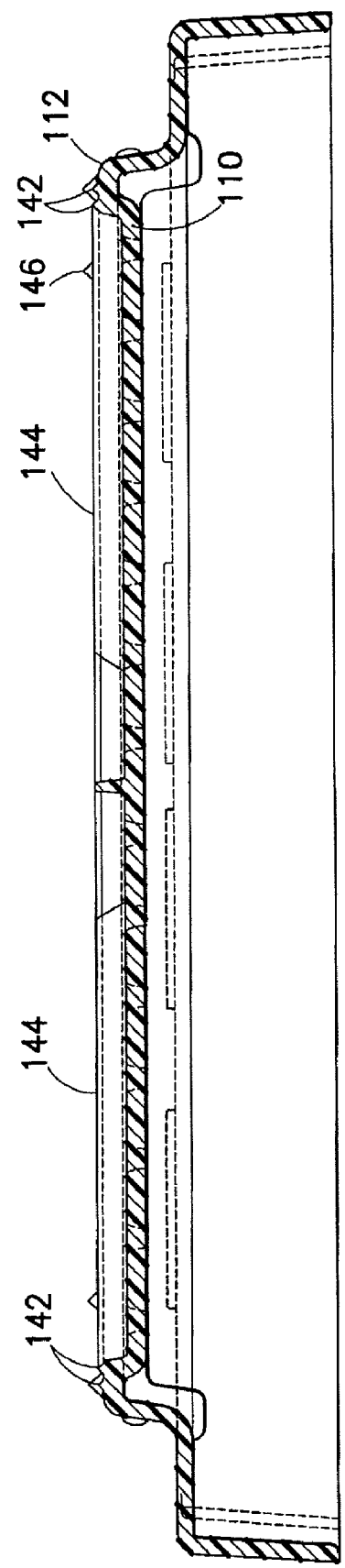

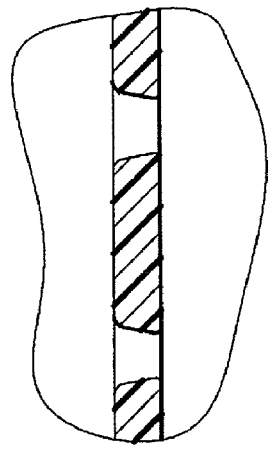
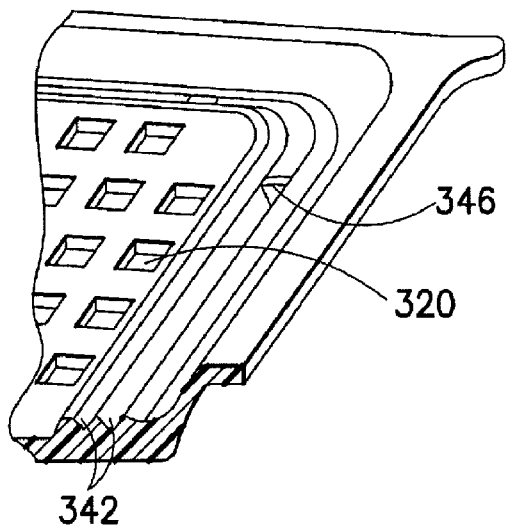
FIG.9
FIG.11
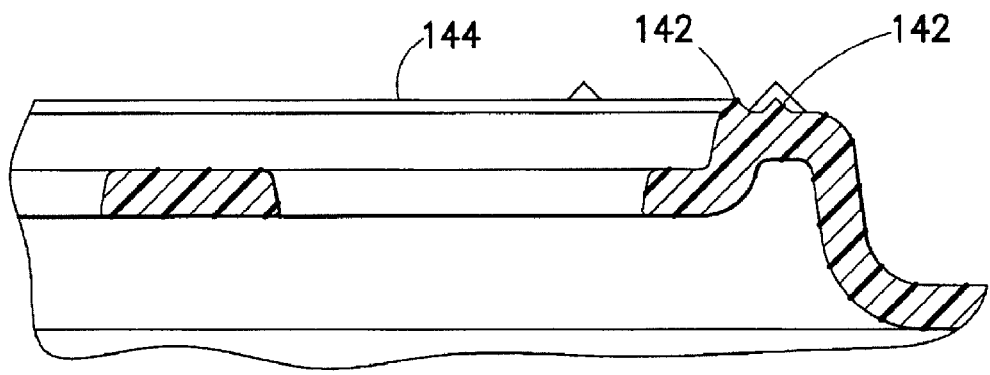
FIG.10

FILTER TOP ASSEMBLY

CROSS REFERENCE TO RELATED APPLICATIONS

This application claims priority to U.S. Provisional Patent Application No. 61/090,783, filed Aug. 21, 2008, entitled "FILTER TOP ASSEMBLY."

TECHNICAL FIELD OF THE INVENTION

This invention relates generally to a filter top assembly for a rodent cage which may be used as a static unit or in connection with a ventilated cage and rack system and particularly to a bonnet that is configured to protect filter paper supported thereby.

BACKGROUND OF THE INVENTION

Laboratories often house animals, such as mice, in ventilated cages. The cages must provide the flow of air in and out of the cage, and can include a filter top through which air can enter or exit the cage. A filter paper can be provided to filter the air entering or exiting the cage.

It is desirable to provide a filter top assembly for a cage having a bonnet which protects the filter paper while being easy to clean.

SUMMARY OF THE INVENTION

A preferred embodiment of the present invention is directed to a bonnet for a filter top cage assembly for use with a cage bottom having a bottom wall and a plurality of side walls defining an opening and a filter top assembly capable of covering the opening, thereby enclosing the cage bottom. The bonnet includes a top wall having a plurality of air passages and one or more projections formed on the top wall to support the filter, wherein each projection defines a filter space between the filter and the plurality of air passages. Thus, it is an object of the invention to provide an improved filter top assembly for an animal cage. Another object of the invention is to provide an improved bonnet for an animal cage which includes protection for a filter. Other objects, features, and characteristics of the present invention, as well as the methods of operation and functions of the related elements of the structure, and the combination of parts and economies of manufacture, will become more apparent upon consideration of the following detailed description with reference to the accompanying drawings, all of which form a part of this specification.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which:

FIG. 6 is a cross-sectional view of the bonnet of FIG. 4 taken along line G-G;

FIG. 9 is a cross-sectional view of section A of FIG. 8 taken along line E-E;

FIG. 10 is a cross-sectional view of section A of FIG. 8 taken along line D-D; and FIG. 11 is an enlarged reverse perspective view of section H of FIG. 3.

DETAILED DESCRIPTION OF A PREFERRED EMBODIMENT

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention. The following presents a detailed description of a preferred embodiment of the present invention.

Figure 1:
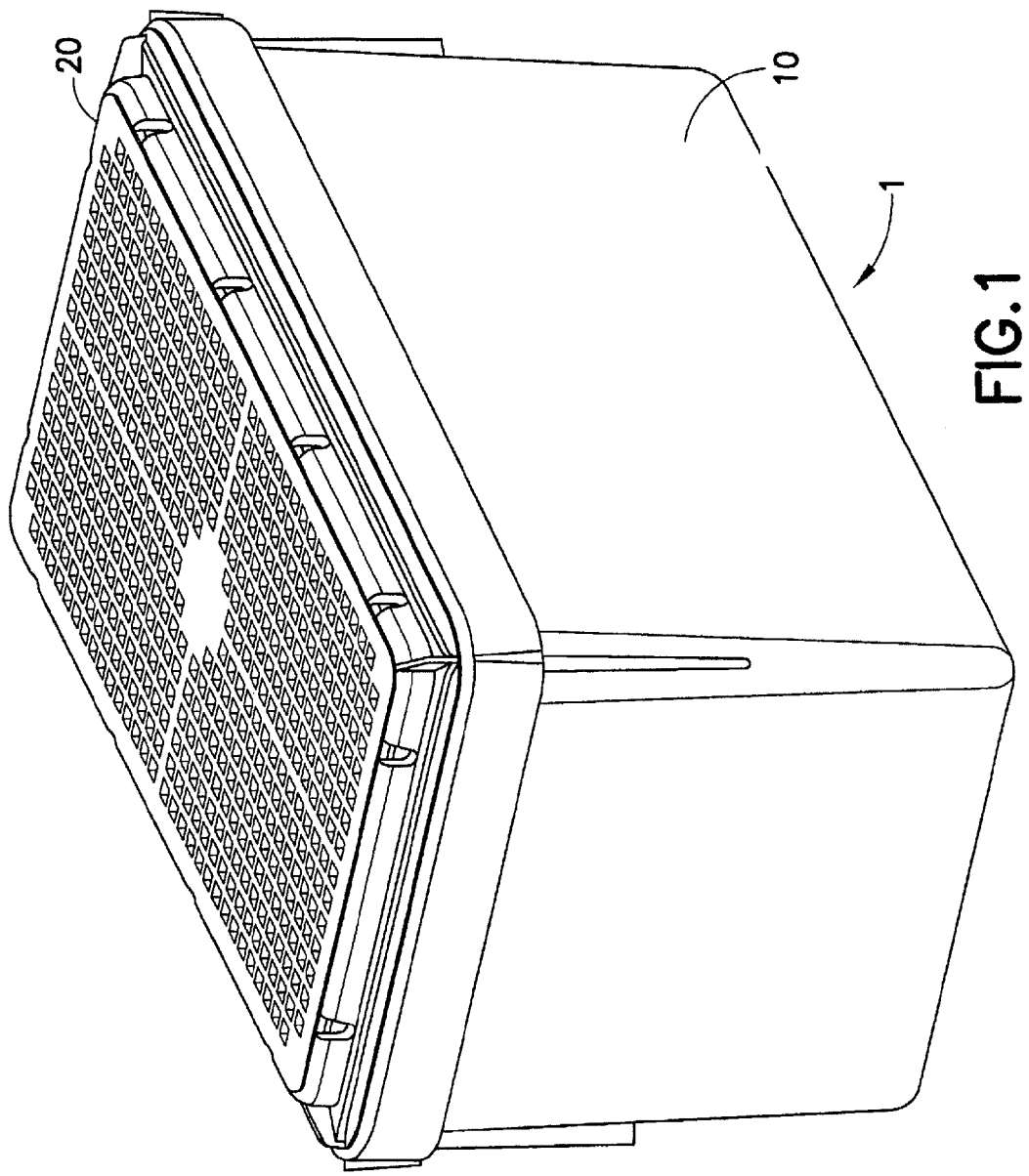
FIG. 1 is a perspective view of a cage assembly in accordance with an embodiment of the invention.
Figure 2:
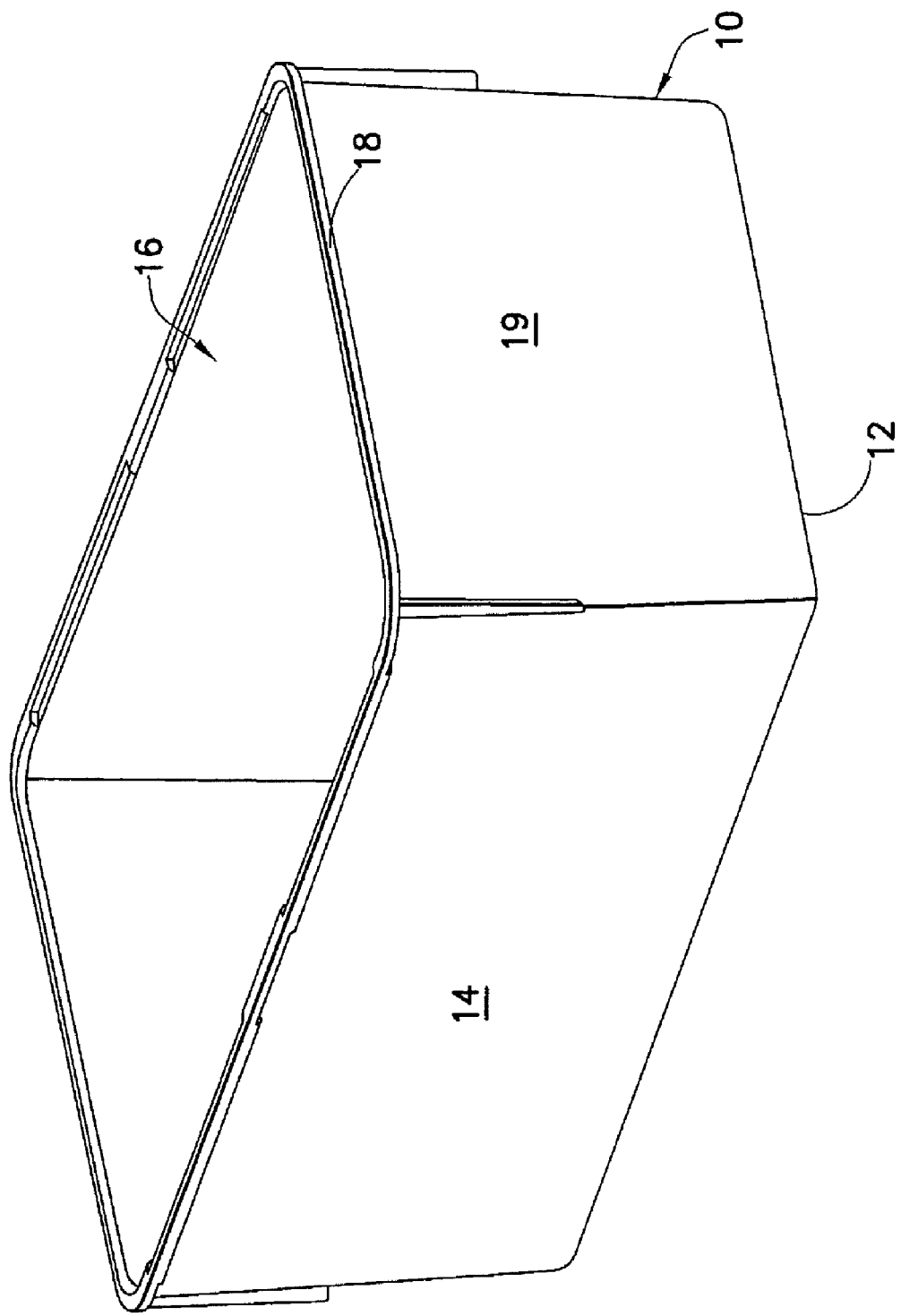
FIG. 2 is a perspective view of the cage bottom of the cage assembly of FIG. 1.

Referring to FIG. 1, an embodiment of a cage assembly 1 is shown, including a cage bottom 10 and a filter top assembly 20. An embodiment of cage bottom 10 is illustrated in FIG. 2 as having a bottom wall 12, and side walls 14 defining an opening 16. Filter top assembly 20 can preferably cover the entire opening 16 to enclose cage bottom 10, preferably creating a seal with side walls 14.

Figure 3:
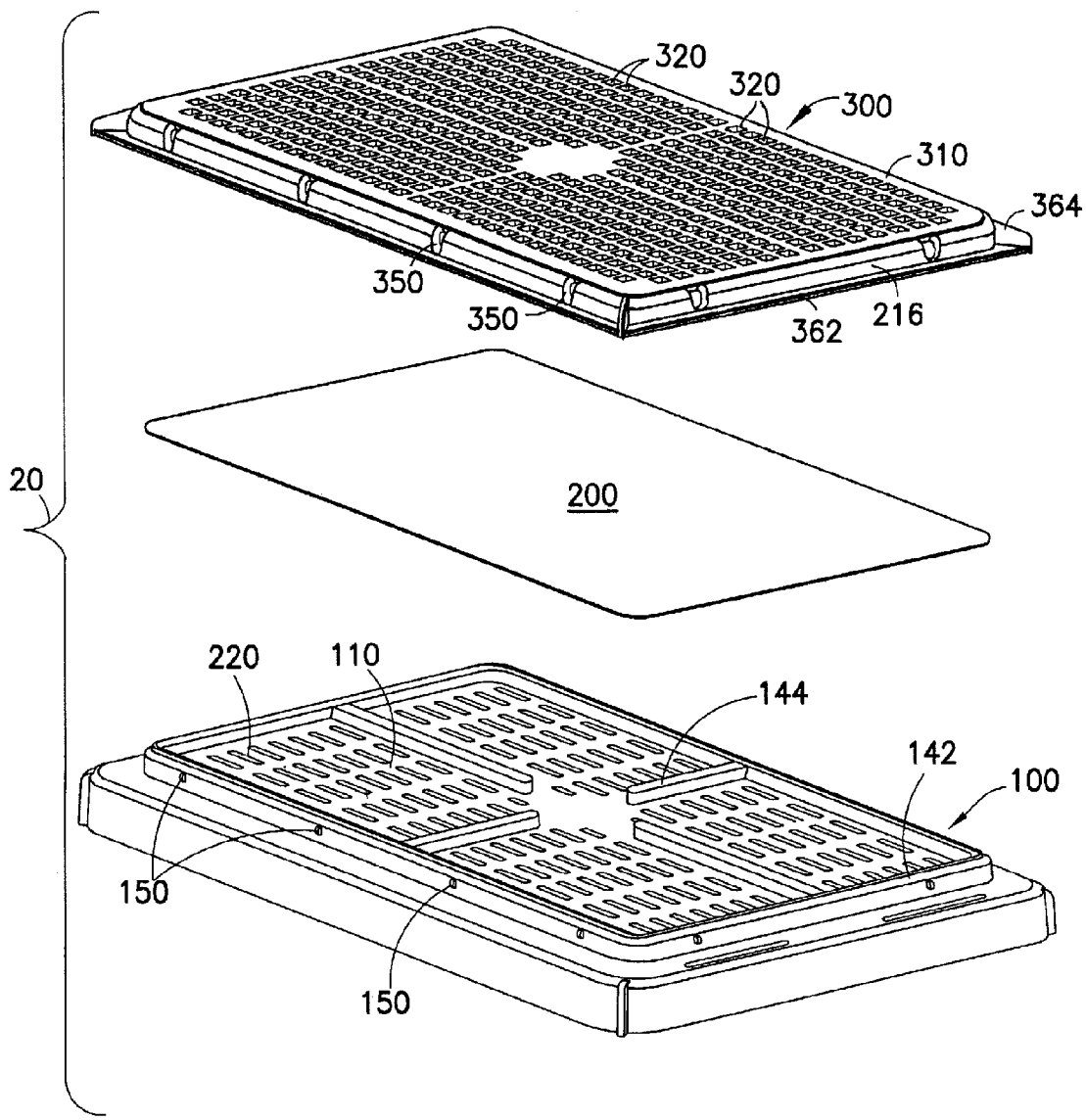
FIG. 3 is an exploded perspective view of a filter top assembly in accordance with an embodiment of the invention.
Figure 4:
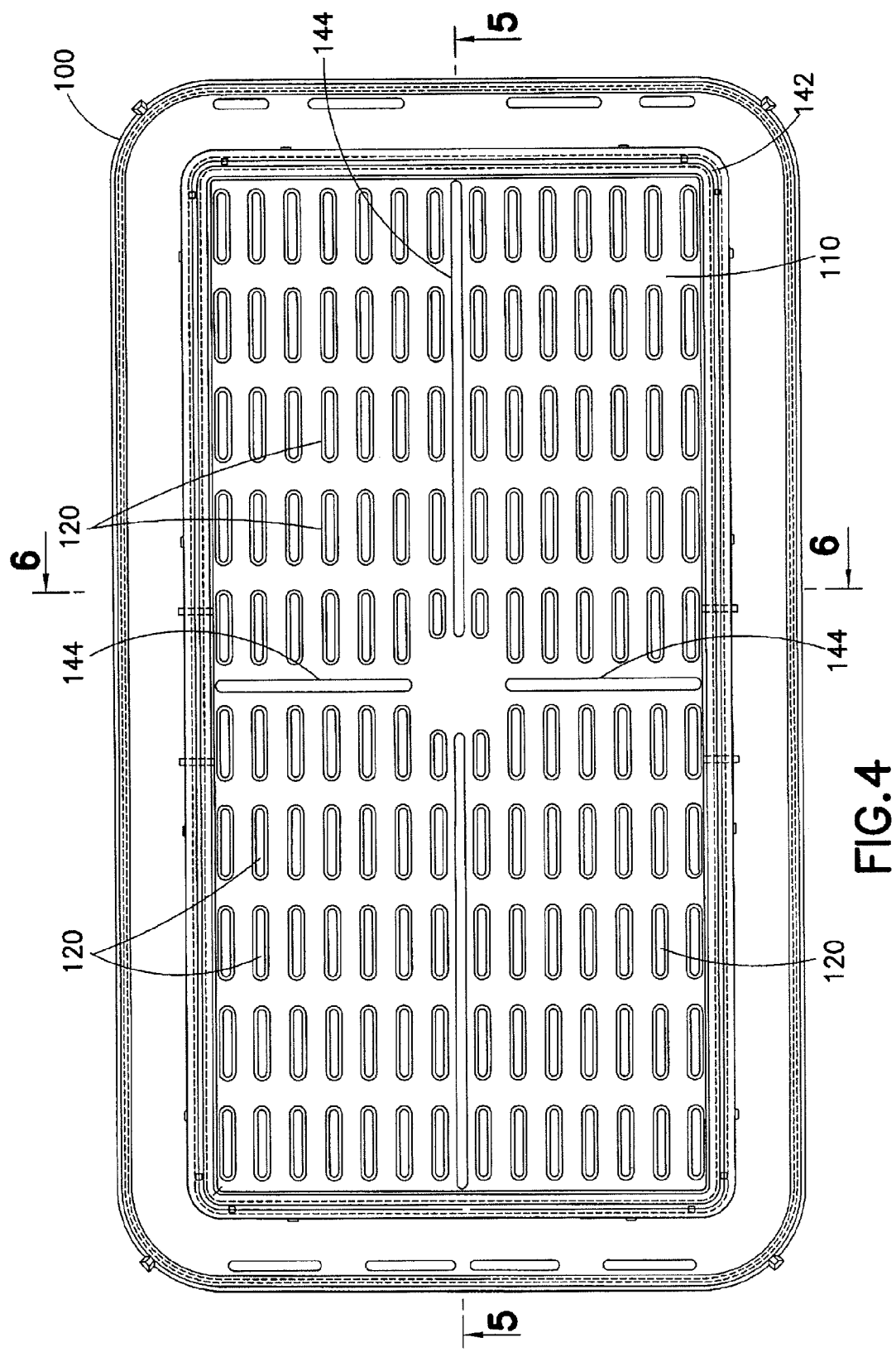
FIG. 4 is a top view of a bonnet in accordance with an embodiment of the invention.
Figure 5:
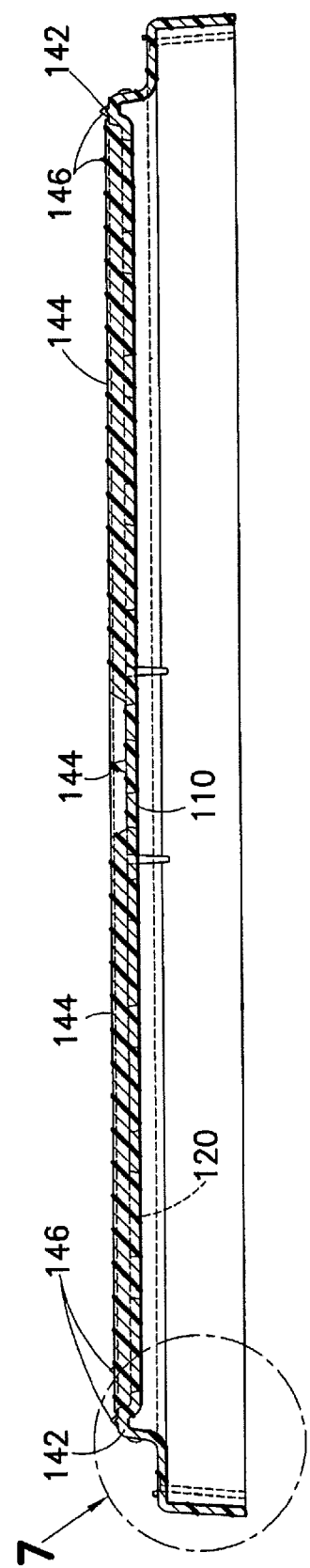
FIG. 5 is a cross-sectional view of the bonnet of FIG. 4 taken along line B-B.

Reference is made to FIG. 3, wherein an embodiment of filter top assembly 20 is shown in further detail. Filter top assembly 20 can include three parts connected together into one unit: a bonnet 100, a filter 200 and a retainer 300. Filter top assembly 20 is preferably in position with respect to cage bottom 10 such that bonnet 100 is in direct contact with cage bottom 10, for example, side walls 14 of cage bottom 10. Filter 200 can be positioned above bonnet 100 and retainer 300 can be positioned above filter 200 and preferably secures filter 200 in position between retainer 300 and bonnet 100.

In an exemplary embodiment as shown in FIGS. 4-7, bonnet 100 is dimensioned and shaped to cover and effectively seal opening 16 of cage bottom 10. Bonnet 100 is preferably formed from a resilient material. A preferred material includes plastic, which can be relatively light weight and durable. It is to be understood that other materials can also be used without deviating from the scope of the invention.

Bonnet 100 preferably includes a top wall 110 having a plurality of air passages, such as slots 120, across its surface so that air can pass through top wall 110 of bonnet 100 into and/or out of cage bottom 10. Slots 120 are preferably sized and dimensioned to prevent the animal, such as a mouse, rat, and/or other laboratory animal housed in cage 1, from getting a purchase position on bonnet 100 or on filter 200 through slot 120, and further to prevent the animal from accessing the filter material through slot 120. Therefore, the animal can be prevented from reaching filter 200. Preferably, the distance between adjacent slots 120, d1, d2 is greater than the animal can bite or grab with its claws. Therefore, the animal is prevented from getting a purchase position on and biting bonnet 100 and filter 200. As shown, slots 120 can have slanted or rounded walls such that slots 120 have smaller openings on the side facing cage bottom 10 and larger openings facing filter 200.

Figure 8:
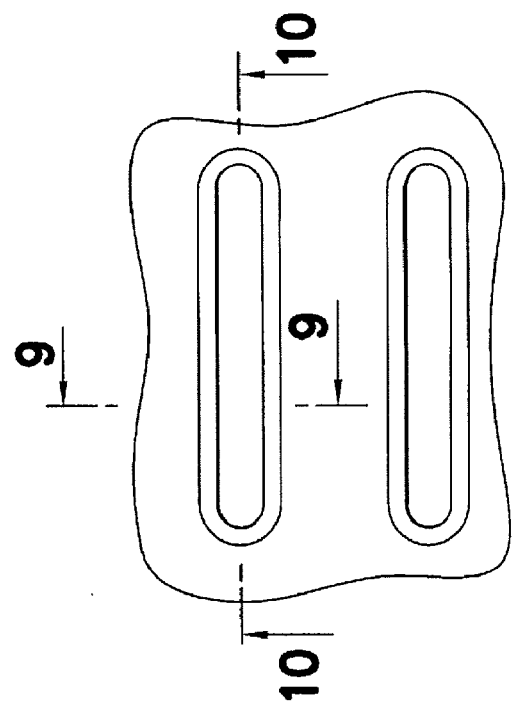
FIG. 8 is an enlarged view of section A of FIG. 4.

Top wall 110 of bonnet 100 can include one or more projections 142, 144 projecting away from cage bottom 10, the projections having a variety of shapes and sizes. The projections preferably facilitate maintaining filter 200 suspended away from slots 120 by supporting filter 200 above top wall 110 and thus away from slots 120. In accordance with the embodiment illustrated in FIGS. 3-7, the projections of bonnet 100 take the form of one or more perimeter ribs 142 and a plurality of internal ribs 144. Perimeter ribs 142 can support filter 200 proximate its outer perimeter, and internal ribs 144 can provide support closer to the middle of filter 200. The likelihood that filter 200 can droop toward top wall 110, thus covering one or more slots 120 of bonnet 100, increases as the unsupported surface area of filter 200 increases. By providing internal ribs 144, filter 200 is preferably prevented from drooping and thus from covering slots 120. The internal ribs 144 may also enhance the structural integrity of bonnet 100 and the assembled filter top assembly 20. As shown in greater detail in FIGS. 6-8, the height of perimeter ribs 142 and internal ribs 144 are substantially equal. Therefore, the distance between filter 200 and top wall 110 of bonnet 100 can be maintained substantially constant.

By providing ribs 142, 144 which maintain filter 200 suspended off of top wall 110, a gap 220 can be created and maintained between bonnet 100 and filter 200. By providing gap 220, the airflow through filter top assembly 20 can be enhanced. By way of non-limiting example, as air flows from within cage bottom 10 through slots 120 into gap 220, there is preferably no difference in pressure. Therefore, the flow of air through slots 120 can be enhanced. Additionally, by providing gap 220, the air traveling into gap 220 through slots 120 from cage bottom 10 can disperse within gap 220. The air can then travel through substantially the entire surface area of filter 200.

Such an arrangement can be beneficial over an arrangement in which filter 200 is flush with top wall 110, wherein air traveling through slot 120 would face an increased pressure differential between cage bottom 10 and filter 100. Also, if filter 200 was flush with top wall 110, air traveling through slot 120 is likely limited to the surface areas of filter 200 exposed by slots 120. By providing gap 220, the air is free to travel through substantially the entire surface area of filter 200, for example, the area within perimeter ribs 142 that do not contact internal ribs 144.

As shown in FIG. 3, retainer 300 can be placed on filter 200 and bonnet 100. Filter 200 is thus sandwiched between retainer 300 and bonnet 100. Retainer 300 is preferably dimensioned and shaped so as to cover the entire filter 200, thus protecting filter 200 from inadvertent contact. Therefore, once filter top assembly 20 is assembled, filter 200 can be protected from damage from contact by the technician handling filter top assembly 20. Retainer 300 can also be perforated, containing apertures 320 throughout its surface 310 to permit air to pass through retainer 300 from gap 220. In accordance with the embodiment shown, apertures 320 can have a generally square shape and form a grid array. An exemplary embodiment of retainer 300 of filter top assembly 20 can include the filter retainer described in U.S. Pat. No. 6,227,146, assigned to Lab Products, Inc. It is to be understood that the size and shape of apertures 320 of retainer can be varied without deviating from the scope of the invention. For example, apertures 320 can be elongated and have a circular, oval, or polygonal shape without deviating from the scope of the invention.

As described above, retainer 300 is preferably not accessible by the animal. Specifically, bonnet 100 and filter 200 are preferably positioned between cage bottom and retainer 300, thus preventing the animal from getting a purchase position on, biting or chewing retainer 300. Thus, the width and length of apertures 320 can be larger than that of slots 120, and apertures 320 can be closer together than slots 120 without increasing the risk of damage by the animal.

Figure 7:
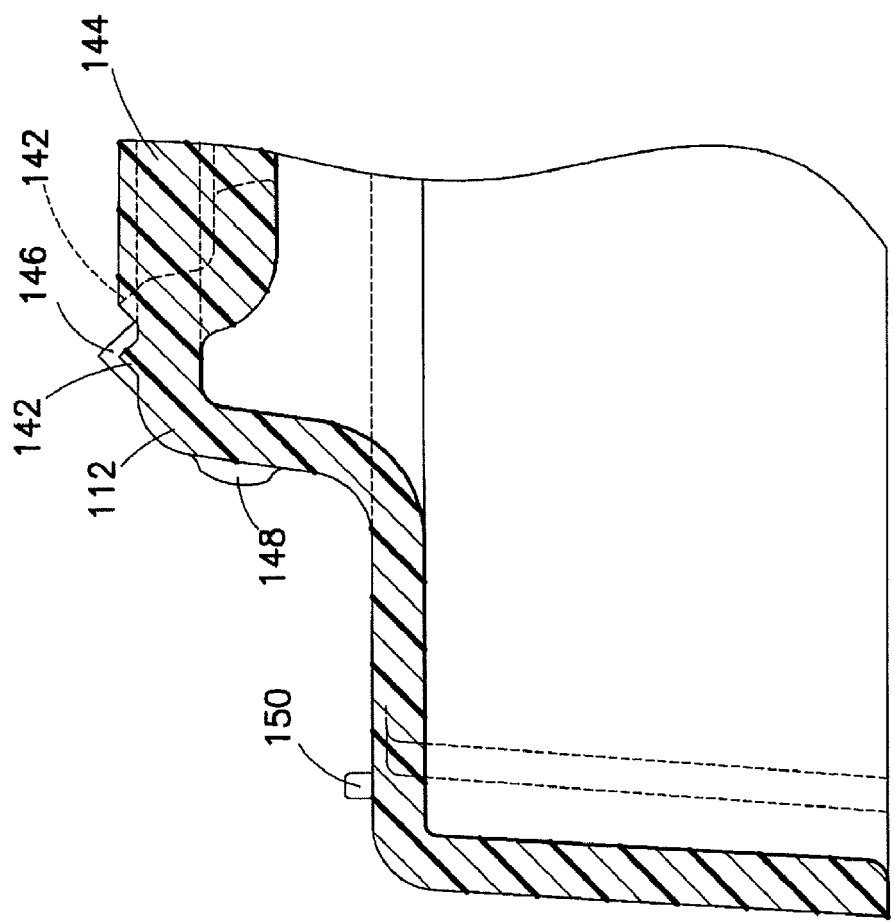
FIG. 7 is an enlarged view of section F of FIG. 5.

Referring to FIGS. 6-7, bonnet 100 preferably includes one or more projections 146 and retainer 300 preferably includes one or more grooves corresponding to projections 146 of bonnet 100. Grooves 346 (FIG. 11) are preferably shaped, dimensioned and positioned so that when retainer 300 is mounted on bonnet 100, grooves 346 can receive projections 146 of bonnet 100 and secure retainer 300 to bonnet 100. Preferably, filter 200 can be further secured in place between bonnet 100 and retainer 300 via the interaction of grooves 346 and projections 146. Thus, retainer 300, filter 200 and bonnet 100 can form a unitary structure, namely filter top assembly 20.

In accordance with an exemplary embodiment, retainer 300 also includes one or more perimeter grooves 342 constructed and arranged to receive perimeter ribs 142 of bonnet 100 when filter top assembly 20 is assembled. Such an arrangement may enhance the pressure on filter 200 between bonnet 100 and retainer 300, which may help maintain filter 200 suspended above top wall 110 of bonnet 100.

Grooves 346 and/or perimeter grooves 342 can be provided on projections extending from surface 310 toward bonnet 100 such that a gap is provided between filter 200 and surface 310 of retainer 300 as well, which may further enhance airflow through filter 200 and thus in and/or out of cage bottom 10.

Bonnet 100 and/or retainer 300 are preferably formed of clear plastic which is substantially rigid, but permits a modest degree of flexure when tortional forces are applied thereto. Because the size, shape and arrangement of slots 120 facilitate preventing the animal from biting, chewing or getting a purchase position on bonnet 100, filter top assembly 20 can be provided on cage bottom 10 without a metal shield as described in U.S. Pat. No. 6,227,146 assigned to Lab Products, Inc. By providing a plastic filter top assembly 20, the cost of manufacturing filter top assembly 20 can be reduced compared to an embodiment including metal components, such as metal shields at least because metal, which is usually more expensive than plastic, can be eliminated. Furthermore, the step of forming the shield, assembling and mounting the shield onto the bonnet can also be eliminated, which can improve the efficiency of manufacturing filter top assembly 20.

Additionally, by manufacturing both bonnet 100 and retainer 300 out of conventional plastics without substantial metal components like the metal shield, the weight of filter top assembly 20 can be reduced. The reduction in weight can be substantial to a laboratory personnel who often lifts and removes thousands of filter top assemblies from cage bottoms in order to study, process, conduct tests on the animal, or clean the cage, etc. Often, after removing the filter top assembly, the personnel flips the filter top assembly and places it on the work station upside down, such that the retainer is on the bottom. Therefore, the reduction in weight by excluding a metal shield can be a substantial relief for the laboratory personnel.

Bonnet 100 preferably includes one or more flanges extending downward from top wall 110 constructed and arranged to be spaced from, encompassing and overhanging the lips 18 of side walls 14 of cage bottom 10. Thus, filter top assembly 20 is preferably prevented from being inadvertently dislodged from cage bottom 10 and must be lifted off to be removed. It should also be noted that the clearance space between the flange and side walls 14 should permit only a slight movement of bonnet 200 on cage bottom 10. However, bonnet 100 preferably includes a peripheral flange extending laterally sufficiently to remain in contact with the lips 18 of side walls 14 despite relative lateral movement between bonnet 200 and cage bottom 10. Therefore, the integrity of the "petrie dish" configuration between bonnet 200 and cage bottom 10 can be maintained.

Retainer 300 can be formed of material having the same properties as those of bonnet 100 described above, having the same or different rigidity. Retainer 300 can include side walls integrally molded with and extending continuously from top wall 310, and which closely fit the side walls of bonnet 100 as shown in FIG. 3. A lateral peripheral flange 362 preferably extends from the side walls of retainer 300. Ribs 364 can extend from respective corners of retainer 300 and enhance structural integrity. Additionally, ribs 364 can act as stacking guides for positioning successive retainers 300.

In a preferred embodiment, filter 200 is a thin sheet of spun-bonded polyester of the type sold by DuPont under the trademark REEMAY 2024. A filter thickness of between 11 and 13 mils has been found adequate for a filter having an area approximately equivalent to top wall 110 of bonnet 100. REEMAY 2024 is used by way of example only and any filter medium having at least its properties or similar properties may be utilized.

To assemble filter top assembly 20, filter 200 can be placed into retainer 300 or on bonnet 100 such that filter 200 is supported by perimeter ribs 142 and internal ribs 144. Preferably, filter 200 extends beyond all of perimeter ribs 142, thus leaving no area above top wall 110 of bonnet uncovered by filter 200. As described above, ribs 142, 144 can support filter 200 and maintain filter 200 suspended away from top wall 110. Preferably, filter 200 also covers projections 146 of bonnet 100. Retainer 300 can be placed on filter 200 on bonnet 100 or the retainer-filter assembly can be placed on bonnet 100, such that grooves 346 are aligned with corresponding projections 146.

Retainer 300 or the retainer-filter assembly is preferably pressed onto bonnet 100 such that projections 146 are received by grooves 346, sandwiching filter 200 there between. Perimeter grooves 342 may also receive perimeter ribs 142 and portions of filter 200 to sandwich the outer perimeter of filter 200 there between. Accordingly, once retainer 300 engages bonnet 100, for example, via projections 146 and grooves 346 and/or perimeter ribs 142 and perimeter ribs 342, filter 200 can be secured in place and an increased tension can be provided to further facilitate maintaining filter 200 suspended from top wall 110 of bonnet 100.

Retainer 300 can be further held in place by means of small projections or detents 150 integrally molded on the outer surface of the side walls of bonnet 100. Similarly, apertures or slots 350 can be formed in the side walls of retainer 300 which are positioned and dimensioned so as to snugly receive detents 150 when retainer 300 is mounted on bonnet 100. In an alternative embodiment, detents may be formed on the inner surface of the side wall of retainer 300, while slots 150 may be formed on the side walls of bonnet 100. It is also possible to dimension retainer 300 to be held to bonnet 100 by another mechanism or a tension fit.

While the present invention has been described with reference to one or more embodiments set forth in considerable detail for the purposes of making a complete disclosure of the invention, such embodiments are merely exemplary, and are not intended to limit or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention.

The invention claimed is:

1. A filter top assembly for use with a cage bottom, the cage bottom having a bottom wall and a plurality of side walls defining an opening and a lip disposed on the opening, the filter top assembly capable of covering the opening, thereby enclosing the cage bottom, the filter top assembly comprising:
   a bonnet having
   a top wall having a plurality of air passages;
   one or more projections formed on the top wall to support a filter, wherein each projection is constructed and arranged to suspend the filter and define a substantially uniform filter space between the filter and the plurality of air passages across the bonnet;
   one or more flanges extending downward from the top wall, the one or more flanges constructed and arranged to engage the lip of the cage bottom to secure the filter top to the cage bottom; and
   one or more peripheral flanges extending laterally, the one or more peripheral flanges constructed and arranged to restrict any lateral movement between the bonnet and the cage bottom.

2. The filter top assembly of claim 1 wherein:
   the plurality of air passages define an interior opening facing the cage bottom having an interior dimension and an exterior opening having an exterior dimension, wherein the interior dimension and the exterior dimension are different.

3. The filter top assembly of claim 1 wherein:
   the plurality of air passages are spaced a predetermined distance apart, wherein the plurality of air passages are sized and arranged to prevent a caged animal from obtaining a purchase position on the bonnet and to prevent the caged animal from accessing the filter through the plurality of air passages.

4. The filter top assembly of claim 3 wherein:
   the predetermined distance is greater than the caged animal can bite or grab with its claws.

5. The filter top assembly of claim 1 wherein:
   the one or more projections form a perimeter rib positioned along a bonnet perimeter of the bonnet and internal ribs selectively positioned across a surface of the top wall.

6. The filter top assembly of claim 1 further comprising a retainer, the retainer constructed and arranged to be selectively engagable with the bonnet, wherein the retainer includes a top surface and a substantially U-shaped projection disposed on the top surface to define an airflow channel to facilitate airflow when the filter top assembly is used in connection with a ventilated rack system.

7. A filter top assembly for use with a cage bottom, the cage bottom having a bottom wall and a plurality of side walls defining an opening, the filter top assembly capable of covering the opening, thereby enclosing the cage bottom, the filter top assembly comprising:

a bonnet including:

a top wall having a plurality of air passages;

one or more projections formed on the top wall to support a filter, wherein each projection is constructed and arranged to suspend the filter and define a substantially uniform filter space between the filter and the plurality of air passages across the bonnet; and a retainer including:

a retainer surface; and one or more grooves disposed on the retainer surface, the one or more grooves constructed and arranged to mirror the one or more projections of the bonnet such that the one or more grooves may receive the one or more projections to secure the retainer to the bonnet and to further retain the filter between the bonnet and the retainer, wherein the retainer is selectively engagable with the bonnet or filter and selectively positionable above the filter.

8. The filter top assembly of claim 7 wherein:

the retainer surface defines one or more retainer apertures.

9. The filter top assembly of claim 8 wherein:

the retainer apertures are constructed and arranged to form a grid array.

10. The filter top assembly of claim 7 wherein the retainer further includes one or more retainer projections extending toward the bonnet, the one or more retainer projections defining a retainer space between the retainer and the filter.

11. The filter top assembly of claim 7 wherein the retainer further includes a substantially U-shaped projection disposed on the retainer surface to define an airflow channel, the substantially U-shaped projection constructed and arranged to facilitate airflow when the filter top assembly is used in connection with a ventilated rack system.

* * * * *